INVENTOR
HANS BEUTELSPACHER
BY Robert H Jacob
AGT.

United States Patent Office 3,454,341
Patented July 8, 1969

3,454,341
METHOD FOR REGISTERING THE REFRACTION INDEX GRADIENT IN SEDIMENTATION AND DIFFUSION MEASUREMENTS
Hans Beutelspacher, Braunschweig, Germany, assignor to Martin Christ, Osterode, Germany
Filed June 29, 1965, Ser. No. 468,011
Claims priority, application Germany, July 6, 1964
C 33,340
Int. Cl. G01n 21/46
U.S. Cl. 356—129      4 Claims

ABSTRACT OF THE DISCLOSURE

Method for registering the first derivation $$\frac{dn}{dx}\Big/x$$

of refraction index gradients with the Toeppler schlieren-lens system constructed in accordance with Philpot and Svensson where the data of the light-dark field appearing in the focal plane are scanned by means of a device that synchronously scans the image surface and is adapted to translate photons into electric signals and records the data on a recording strip in which system the light source is stationary and the scanning device is movable with respect to the image.

Background of the invention

The invention relates to a method for registering the first derivation of the refraction index gradient by means of a Toeppler stria arrangement in the form of construction according to Philpot and Svensson.

In the method according to Philpot-Svensson the illuminated horizontal slot is imaged upon the rotatable oblique slot by means of the stria or streak lenses. The oblique slot, which may be provided with a readable scale for angular measurements in degrees, is projected onto the focal plane by the cylindrical lens. In the known method the focal plane consists of photosensitive material. By means of this method the sedimentation constant in an ultracentrifuge can be determined, diffusion measurements and electrophoretic analyses may be carried out, i.e., the concentration course of a solution is measured in relation to the cell level. The fluctuation or changing of the refraction index gradient is made visible in that at certain time intervals the curve of the refraction index gradient is photographically recorded.

The known method, however, is subject to the following essential shortcomings:

(1) The width of the horizontal light gap has to be adjusted to the oblique gap or slot because of the image contrast, i.e., because the horizontal slot or gap must be set very narrow, only a very poorly illuminated image is obtained which in photographing requires long exposure times, for example up to 50 seconds for colored solutions. Owing to the long time exposures which are necessary the curves photographed are not sharp with photographs of fluctuating refraction index gradients; besides, during the time period of an exposure, i.e., a time which may be as long as 50 seconds, no conclusion may be drawn regarding the changes of the curve to be plotted which takes place during this period of time.

(2) The resulting photographic image reflects subjective measuring errors due to blurred pictures, indistinct and very thick lines, defraction intervals, distorted points of the curves and uncertainty caused by wide base lines. As a result the plotting of the curves obtained becomes difficult.

(3) With photographic reproduction of the gradient curves one is restricted by the magnification provided by the photographic apparatus; it was found to be especially disadvantageous that the proportions of the abscissa and the ordinate relative to one another are fixed. Besides, after the photograph has been taken it is necessary to carry out the known developing process, which for some applications is much too long, before the data in the form of photographs is available for the researcher.

Summary of the invention

This is where the invention begins and eliminates these essential shortcomings, in that in the use of the method initially mentioned the data of the light and dark field appearing in the focal plane are scanned by means of a device which synchronously moves across the focal plane and converts photons into electrical signals and then indicates or records them in a known manner. For this purpose a photo cell or a secondary electron multiplier may be used. To record the output factor or quantity of the secondary electron multiplier or of a photocell a registering strip may be used which is provided with time markings. In accordance with one embodiment of the invention it is provided that the light from the focal plane enters through a gap, the dimensions of which are variable and which is movable with the photo cell or with the secondary electron multiplier. A particularly preferred embodiment of the invention provides that a radiation separator or divider is arranged behind the oblique gap which simultaneously permits of a photoelectric and a photographic recordation of the refraction index gradient.

In practicing the method in accordance with the invention it is possible to work with a much wider horizontal gap than what is possible in photographis recording. In this manner greater light intensity is obtained, which in turn makes possible recordings in rapid sequence. Changes in the curve of the refraction index gradient thus are recordable within shorter time periods. Furthermore, the gradients in the photoelectric method appear as fine lines which can be readily measured or plotted in as curves. A further advantage of the method in accordance with the invention exists in that considerable liberties may be taken in the choice of the recording scales as a result of which delicate characteristics of the curve that cannot be discerned in the photographic method are made accessible for observation. With the aid of automatic registration, for example, on a registering strip, the results of the measurements are immediately visible, i.e., the experimenter need no longer wait for the developing of the photographic plates.

Brief description of the drawings

Further advantages and details of the invention will become apparent from the following description of the method if reference is had to the accompanying drawings, in which.

Description of the invention

Figure 1:
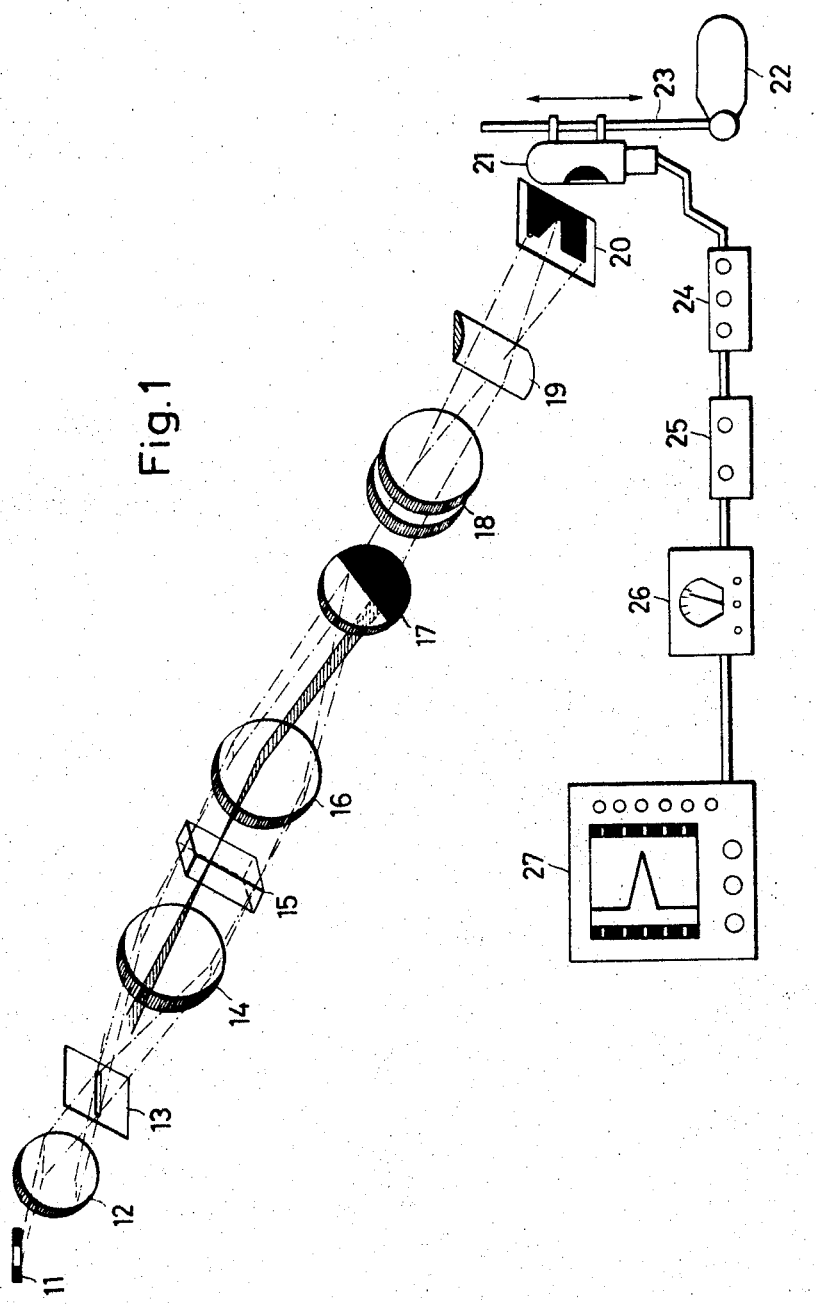
FIG. 1 illustrates schematically the construction of a Philpot-Svensson arrangement which includes the means required to practice the method in accordance with the invention.

The basic construction of an apparatus suitable for practicing the method in accordance with the invention is shown in FIG. 1. Here the light passes from a light source 11 through a condenser lens 12 to the horizontal slot 13 which is imaged at the location of the oblique slot 17 by way of the first stria lens 14, the cell 15 which receives the medium to be measured and the second stria lens 16. After that the light reaches the image surface or focal plane 20 through the camera objective or lens 18 and the cylindrical lens 19, whereby in accordance with criteria to be described later a bright field or a dark field develops in the focal plane in which the curve to be recorded appears as a dark or a bright wedge.

Figure 5:
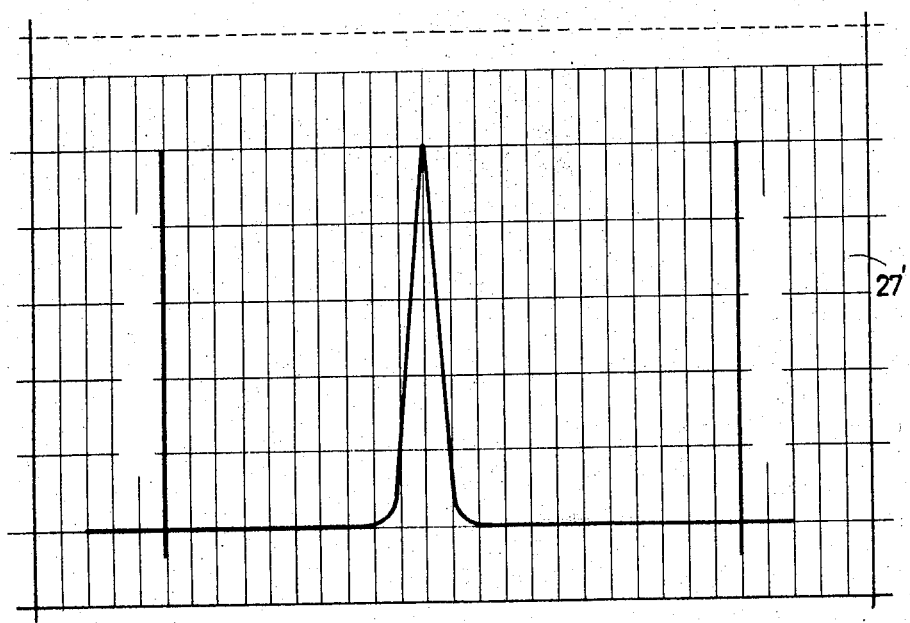
FIG. 5 shows a photoelectrically recorded curve of the refraction index gradient.
Figure 3:
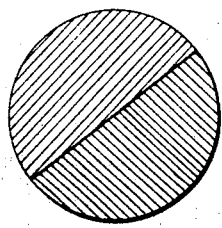
FIG. 3 shows a two field polarizer employed as oblique gap.

In accordance with one embodiment of the invention the image in the focal plane 20 is now scanned by a secondary electron multiplier 21. In this connection a device can be provided for scanning the focal plane, as schematically illustrated at 23, which is driven by a synchronous motor 22. For the operation of the secondary electron multiplier 21 a measuring device 24 and a high potential device with an indicator 26 are provided. The output factor of the secondary electron multiplier is fed to an amplifier and balancing or leveling device 25 to the automatic recorder 27 which registers the curve of a refraction index gradient, for example on a registering strip 27' (see FIG. 5).

Figure 2:
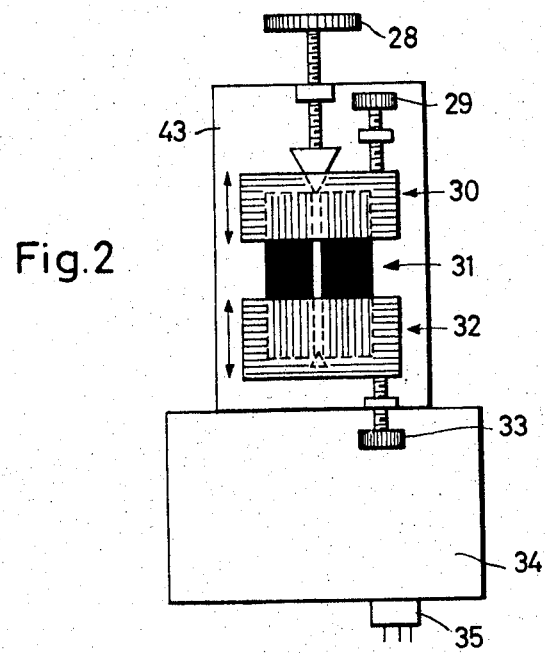
FIG. 2 is a schematic representation of the device for changing the gap in front of the photo cell or of the secondary electron multiplier.

The light arriving from the focal plane enters the photosensitive surface of the secondary electron multiplier 21 through a gap of adjustable length and width. The device for adjusting this gap is schematically illustrated in FIG. 2. A knurled screw 28 is provided for fine adjustment of the gap width, and another knurled screw 29 for adjusting the upper limiting blind or stop 30 as well as a knurled screw 33 for setting the lower limiting blind or stop 32. The gap thus formed is identified by numeral 31. The device defining the gap is rigidly connected with the housing 43 for the secondary electron multiplier 21 and suitably also with the housing 34 for the potential divider of the secondary electron multiplier. An electric contact 35 is provided for supplying current. The gap 31 thus is displaced with the secondary electron multiplier.

Figure 4A:
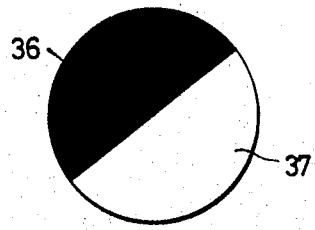
FIGS. 4a and 4b illustrate schematically the change of the dark field of the semi-plate after rotation of the analyzer through a 90° angle.
Figure 4B:
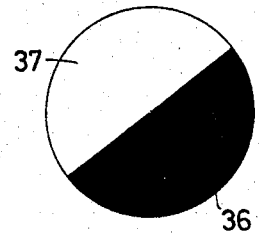

In accordance with an ancillary feature of the invention an L-shaped two field polarizer of quartz or two polarizing foils between two plano spherical lenses may be used, where a polarizing foil of the same magnitude rotatable therewith is coupled as an analyzer, in lieu of the metal disk used by Philpot as the oblique gap or slot where instead of the line pattern of maximum brilliance, there appears a transmutation between a dark and a light field as a curve dispersed upon the focussing screen. By rotating the analyzer the conditions illustrated in FIGS. 4a and 4b can be obtained, where the translucent plate half is indicated at 37 and the opaque plate half at 36. By rotating the analyzer it is also possible to adjust the shade or tone of the color as a light or a dark field with all transmutations in a manner that the color tone of one-half of the curve is extensively balanced with the color tone of the other half. In this manner it is possible by rotating the analyzer to adjust the refraction index gradient curve which essentially represents a gauss type distribution curve as a light field on a black ground and vice versa, without it being necessary to adjust the angle of the oblique slot.

Figure 6A:
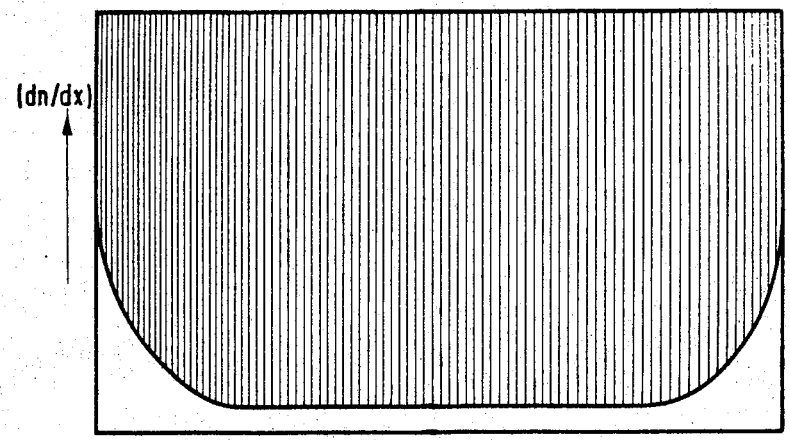
FIGS. 6a and 6b represent respectively a photographic and a photoelectric recording of a balanced run.
Figure 6B:
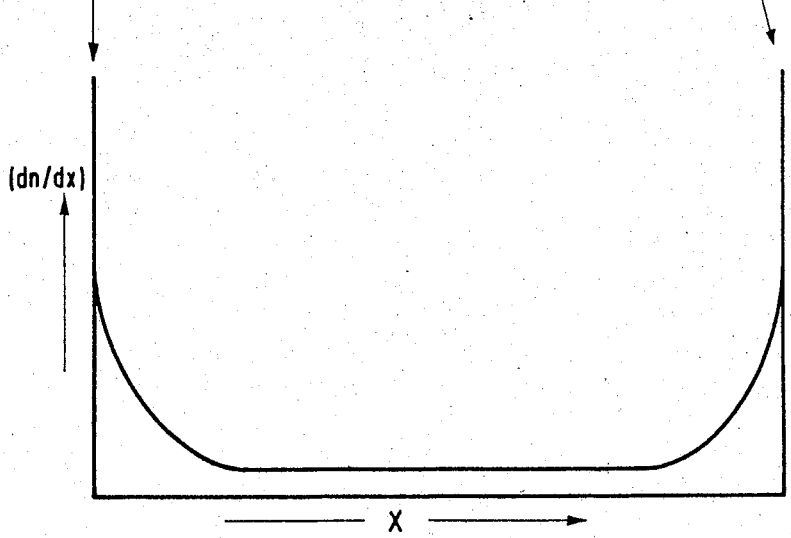

In gauging high molecular compounds (mol. weight above 30,000) no creeping of the gradients of the dissolved solvent occurs. Between the diffusion and the sedimentation a distribution of balance of the concentration takes place in the gravitational field of the ultracentrifuge from which it is possible to compute the molecular weight. The gravitational curves and approximate equilibria according to Archibald can also be carried out by the method in accordance with the invention. In this connection one obtains the photoelectric registration of an equilibrium run as illustrated in FIG. 6. For comparison the illustration of a corresponding photographic recordation of an equilibrium run is illustrated in FIG. 6a. The reference numeral 38 indicates the bottom of the cell.

As with the known methods which operate with photographic recording, it is also necessary with the method in accordance with the invention to obtain reference points on the recording strip or the like. In the photographic method it was necessary to provide a counterweight cell with two holes for marking the reference lines while making photographs. In the method in accordance with the invention this is not necessary because, as any man skilled in the art knows, recording registration means are provided with time markings in a particularly simple manner. Of course, the application of time markings can also be provided upon the registration strips in synchronism with the drive of the secondary electron multiplier 21. It is recommended as being particularly advantageous that in the method in accordance with the invention a second measuring cell be introduced while saving the counterweight cell provided for mixing purposes, which second cell, for example, may serve as a substitute for a double selector cell and which is usable for all possible compensation purposes of the liquid in the actual mixing cell.

For the reliable recording of refraction index gradients with colored solutions while using white light, a double quartz plate is preferably used as "cutter" in lieu of two field polarization foils, which is composed of one right turning and one left turning quartz plate with a sharp dividing line. For obtaining a sharp dividing line the edges are accurately ground at an angle of 90°. A double quartz plate of the "Solei" type having a thickness of approximately 3.75 mm. appears reddish in one plate half and bluish in the other when white light is used. In this manner it is possible by fine adjustment of the analyzer to compensate for the color of the solution with one plate half while the other plate half acts as "cutter."

Figure 7:
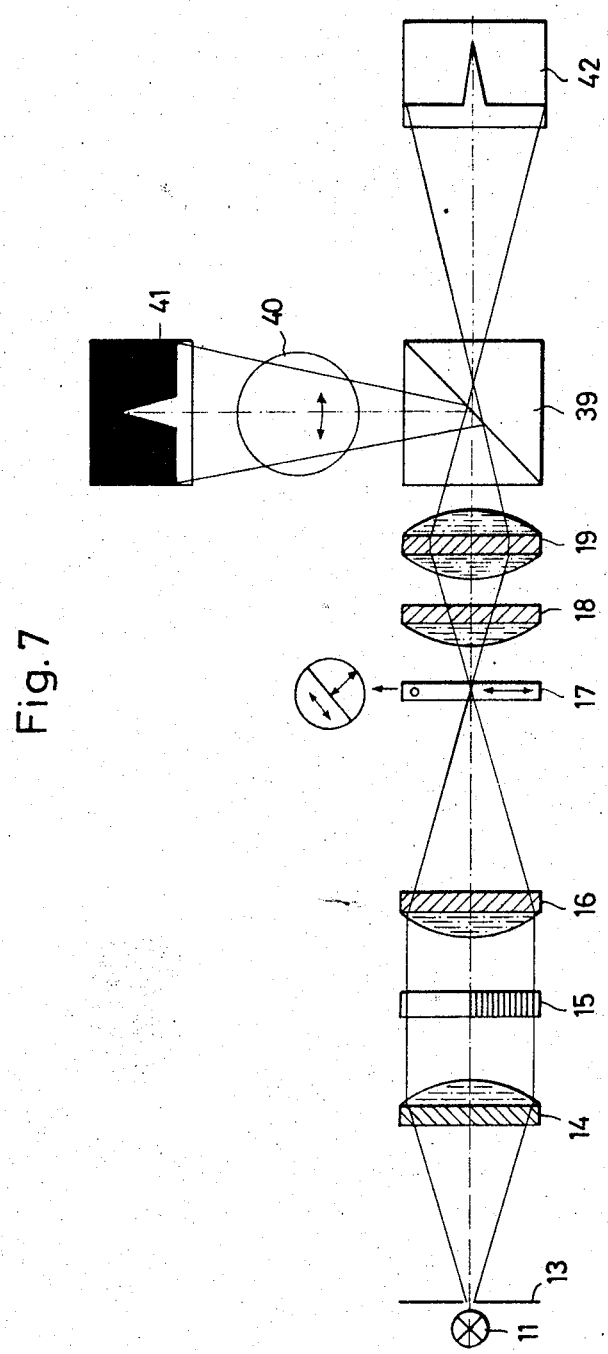
FIG. 7 is the arrangement of the optics for simultaneous photoelectric and photographic recording.

Of course, it is also possible to construct the device used with the method in accordance with the invention so that a photoelectric recording as well as also a photographic recording of the refraction index gradient is made possible. Such a device is schematically illustrated in FIG. 7. The structural elements identified by reference numerals 11, 13, 14, 15, 16, 17, 18 and 19 correspond essentially to the respective individual components of the arrangement in accordance with FIG. 1. As may be seen, however, there is in this case a radiation separator 39 behind the cylindrical lens 19, which separator may consist, for example, of a cube or die having a diagonal semitranslucent mirror, so that with the passage of the rays an image is formed at 42 for photographic recording, and by interposing the analyzer 40 an image for photoelectric recording is formed at 41. In this connection a double field polarizer in L shape is used as the oblique gap. The corresponding analyzer lies only in the path of the rays for the image serving for the photoelectric recording.

All details illustrated or described are essential for the invention.

Having now described my invention with reference to the embodiment illustrated in the drawings, I do not wish to be limited thereto, but what I desire to protect by Letters Patent of the United States is set forth in the appended claims.

I claim:
1. A mehod for recording the first derivative of the refractive index gradient $dn/dx$ of a sample as a function of displacement $x$ along the sample comprising: generating a light-dark field representative of the index gradient of the sample in the focal plane of a system according to the Philpot-Svensson method by means of the stria arrangement of Toeppler, scanning the light-dark field and producing electrical signals representative of the index gradient as a function of displacement along the sample, and recording the signals so produced to provide a recording of $dn/dx$ as a function of displacement $x$.

2. The method for recording the first derivative of the refractive index gradient $dn/dx$ of a sample as a function of displacement $x$ along the sample as set forth in claim 1, wherein the light-dark field generated in the focal plane is simultaneously projected for photographic recording and photoelectric recording.

3. The method for recording the first derivative of the refractive index gradient $dn/dx$ of a sample as a function of displacement $x$ along the sample as set forth in claim 1, wherein the index gradient is recorded as an amplitude time function.

4. A method for recording the first derivative of the refractive index gradient $dn/dx$ of a sample as a function of displacement $x$ along the sample comprising: generating a light-dark field representative of the index gradient of the sample in the focal plane of a system according to the Philpot-Svensson method by means of a stria arrangement of Toeppler, adjusting the cross-sectional length and width of a scanning beam of light projecting from said light-dark field, scanning the light-dark field with said beam and producing electrical signals representative of the index gradient as a function of displacement along the sample, and recording the signals so produced to provide a recording of $dn/dx$ as a function of displacement $x$.

References Cited

UNITED STATES PATENTS 3,171,881    3/1965    Morokuma.

FOREIGN PATENTS 629,814    10/1961    Canada.

RONALD L. WIBERT, *Primary Examiner.*

J. P. McGRAW, *Assistant Examiner.*

U.S. Cl. X.R.

356—105, 107